United States Patent
Yasuda

[11] Patent Number: 5,997,139
[45] Date of Patent: Dec. 7, 1999

[54] POLARIZING LENS FOR SUNGLASSES, METHOD AND APPARATUS FOR PRODUCING SAID LENS

[75] Inventor: Shinji Yasuda, Hyogo, Japan

[73] Assignee: Wintec International Japan Corporation, Hyogo, Japan

[21] Appl. No.: 09/233,646

[22] Filed: Jan. 19, 1999

[30] Foreign Application Priority Data

Dec. 7, 1998 [JP] Japan .................................. 10-347014

[51] Int. Cl.⁶ ................ G02C 7/12; G02C 7/02

[52] U.S. Cl. .................. 351/49; 351/163; 351/177; 351/44; 264/1.7

[58] Field of Search .................. 351/44, 49, 163, 351/177; 359/483, 485, 487; 264/1.31, 1.7

[56] References Cited

U.S. PATENT DOCUMENTS 5,135,298  8/1992  Peltman .................................. 351/163
5,434,707  7/1995  Dalzell et al. ........................... 351/49

Primary Examiner—Huy Mai
Attorney, Agent, or Firm—Jordan and Hamburg LLP

[57] ABSTRACT

A polarizing lens for sunglasses comprising a laminate having a polarizing thin layer and supporting layers made from polycarbonate-resin being laminated on both surfaces of the thin layer, and a method and an apparatus for producing said polarizing lens. The laminate used for the inventive polarizing lens is formed as a oblong in which polarizing axis is corresponded to the cross direction thereof, and is so curved as to have a non-spherical curved surface whose curve along the direction of polarizing axis is shaper than curve along the direction orthogonal to the polarizing axis.

4 Claims, 16 Drawing Sheets

F I G. 1
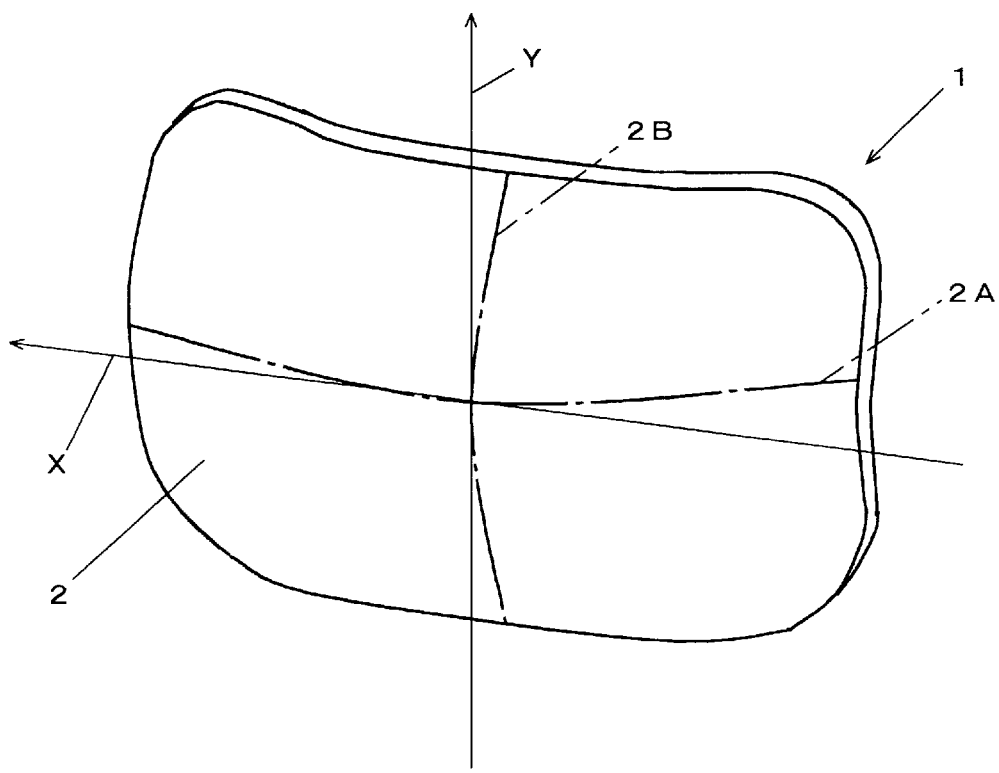
F I G. 2
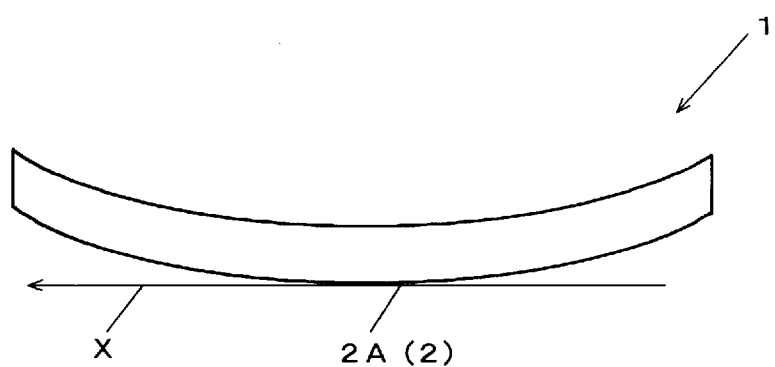

F I G. 3
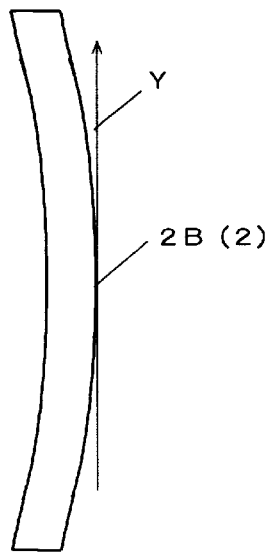
F I G. 4
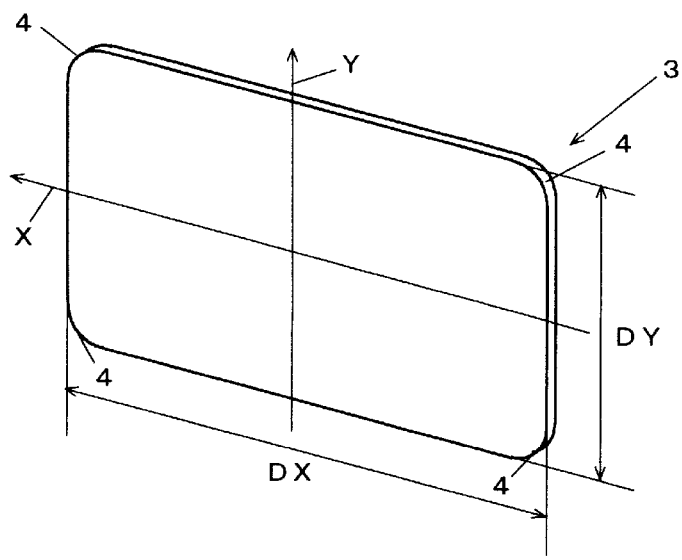

FIG. 9

| No. | | C | R | L | U | D | No. | | C | R | L | U | D |
|---|---|---|---|---|---|---|---|---|---|---|---|---|---|
| 1 | S | -0.09 | -0.11 | -0.08 | -0.08 | -0.07 | 19 | S | -0.11 | -0.09 | -0.07 | -0.08 | -0.09 |
| | C | -0.00 | -0.00 | -0.06 | -0.08 | -0.00 | | C | -0.00 | -0.00 | -0.04 | -0.07 | -0.04 |
| 2 | S | -0.12 | -0.10 | -0.10 | -0.08 | -0.03 | 20 | S | -0.12 | -0.11 | -0.06 | -0.09 | -0.08 |
| | C | -0.00 | -0.06 | -0.06 | -0.06 | -0.11 | | C | -0.00 | -0.07 | -0.00 | -0.05 | -0.05 |
| 3 | S | -0.12 | -0.08 | -0.08 | -0.04 | -0.05 | 21 | S | -0.12 | -0.07 | -0.09 | -0.12 | -0.08 |
| | C | -0.00 | -0.05 | -0.00 | -0.06 | -0.08 | | C | -0.00 | -0.06 | -0.05 | -0.00 | -0.05 |
| 4 | S | -0.07 | -0.07 | -0.10 | -0.12 | -0.07 | 22 | S | -0.08 | -0.09 | -0.11 | -0.11 | -0.12 |
| | C | -0.05 | -0.07 | -0.00 | -0.00 | -0.08 | | C | -0.06 | -0.00 | -0.00 | -0.00 | -0.06 |
| 5 | S | -0.03 | -0.10 | -0.08 | -0.05 | -0.05 | 23 | S | -0.11 | -0.08 | -0.10 | -0.08 | -0.12 |
| | C | -0.08 | -0.05 | -0.00 | -0.10 | -0.08 | | C | -0.00 | -0.07 | -0.00 | -0.07 | -0.06 |
| 6 | S | -0.05 | -0.10 | -0.07 | -0.04 | -0.09 | 24 | S | -0.05 | -0.08 | -0.07 | -0.08 | -0.09 |
| | C | -0.04 | -0.00 | -0.06 | -0.09 | -0.05 | | C | -0.05 | -0.00 | -0.05 | -0.11 | -0.05 |
| 7 | S | -0.10 | -0.09 | -0.07 | -0.08 | -0.06 | 25 | S | -0.09 | -0.06 | -0.09 | -0.11 | -0.03 |
| | C | -0.00 | -0.00 | -0.09 | -0.06 | -0.09 | | C | -0.04 | -0.03 | -0.03 | -0.00 | -0.09 |
| 8 | S | -0.09 | -0.11 | -0.08 | -0.08 | -0.07 | 26 | S | -0.12 | -0.09 | -0.08 | -0.06 | -0.05 |
| | C | -0.00 | -0.00 | -0.00 | -0.05 | -0.07 | | C | -0.00 | -0.08 | -0.04 | -0.08 | -0.11 |
| 9 | S | -0.12 | -0.09 | -0.08 | -0.12 | -0.06 | 27 | S | -0.09 | -0.11 | -0.12 | -0.08 | -0.10 |
| | C | -0.00 | -0.00 | -0.04 | -0.04 | -0.08 | | C | -0.04 | -0.00 | -0.00 | -0.06 | -0.05 |
| 10 | S | -0.11 | -0.07 | -0.10 | -0.10 | -0.06 | 28 | S | -0.12 | -0.08 | -0.08 | -0.11 | -0.11 |
| | C | -0.00 | -0.07 | -0.05 | -0.06 | -0.08 | | C | -0.00 | -0.08 | -0.04 | -0.04 | -0.05 |
| 11 | S | -0.12 | -0.10 | -0.12 | -0.10 | -0.08 | 29 | S | -0.05 | -0.09 | -0.07 | -0.04 | -0.12 |
| | C | -0.00 | -0.00 | -0.00 | -0.07 | -0.10 | | C | -0.05 | -0.04 | -0.00 | -0.10 | -0.04 |
| 12 | S | -0.12 | -0.08 | -0.10 | -0.12 | -0.11 | 30 | S | -0.09 | -0.08 | -0.09 | -0.05 | -0.11 |
| | C | -0.04 | -0.00 | -0.07 | -0.00 | -0.04 | | C | -0.00 | -0.00 | -0.00 | -0.09 | -0.06 |
| 13 | S | -0.10 | -0.10 | -0.08 | -0.09 | -0.08 | 31 | S | -0.10 | -0.06 | -0.05 | -0.10 | -0.07 |
| | C | -0.00 | -0.00 | -0.07 | -0.07 | -0.05 | | C | -0.00 | -0.11 | -0.05 | -0.04 | -0.10 |
| 14 | S | -0.06 | -0.07 | -0.10 | -0.03 | -0.04 | 32 | S | -0.05 | -0.10 | -0.09 | -0.07 | -0.12 |
| | C | -0.04 | -0.05 | -0.06 | -0.11 | -0.11 | | C | -0.05 | -0.09 | -0.06 | -0.05 | -0.03 |
| 15 | S | -0.09 | -0.12 | -0.08 | -0.06 | -0.08 | 33 | S | -0.10 | -0.09 | -0.06 | -0.06 | -0.09 |
| | C | -0.00 | -0.00 | -0.04 | -0.10 | -0.06 | | C | -0.00 | -0.07 | -0.05 | -0.05 | -0.05 |
| 16 | S | -0.11 | -0.11 | -010 | -0.08 | -0.07 | 34 | S | -0.10 | -0.05 | -0.03 | -0.12 | -0.11 |
| | C | -0.00 | -0.08 | -0.00 | -0.07 | -0.08 | | C | -0.00 | -0.06 | -0.08 | -0.00 | -0.00 |
| 17 | S | -0.10 | -0.11 | -0.10 | -0.04 | -0.05 | 35 | S | -0.12 | -0.09 | -0.10 | -0.11 | -0.12 |
| | C | -0.00 | -0.00 | -0.05 | -0.09 | -0.08 | | C | -0.00 | -0.07 | -0.08 | -0.00 | -0.00 |
| 18 | S | -0.09 | -0.07 | -0.07 | -0.11 | -0.09 | 36 | S | -0.06 | -0.07 | -0.06 | -0.03 | -0.12 |
| | C | -0.00 | -0.05 | -0.08 | -0.06 | -0.00 | | C | -0.05 | -0.06 | -0.07 | -0.11 | -0.04 |

FIG.11

| No. | | C | R | L | U | D | No. | | C | R | L | U | D |
|---|---|---|---|---|---|---|---|---|---|---|---|---|---|
| 1 | S | -0.10 | -0.13 | -0.07 | -0.11 | -0.08 | 19 | S | -0.09 | -0.07 | -0.08 | -0.10 | -0.06 |
|   | C | -0.00 | -0.00 | -0.00 | -0.00 | -0.05 |    | C | -0.00 | -0.11 | -0.08 | -0.08 | -0.14 |
| 2 | S | -0.12 | -0.05 | -0.15 | -0.10 | -0.07 | 20 | S | -0.07 | -0.09 | -0.07 | -0.04 | -0.13 |
|   | C | -0.00 | -0.05 | -0.00 | -0.07 | -0.09 |    | C | -0.04 | -0.06 | -0.09 | -0.14 | -0.04 |
| 3 | S | -0.12 | -0.09 | -0.10 | -0.16 | -0.16 | 21 | S | -0.12 | -0.09 | -0.08 | -0.10 | -0.05 |
|   | C | -0.07 | -0.04 | -0.00 | -0.00 | -0.00 |    | C | -0.00 | -0.04 | -0.08 | -0.06 | -0.15 |
| 4 | S | -0.12 | -0.12 | -0.11 | -0.07 | -0.16 | 22 | S | -0.09 | -0.08 | -0.09 | -0.10 | -0.14 |
|   | C | -0.00 | -0.00 | -0.08 | -0.08 | -0.00 |    | C | -0.00 | -0.09 | -0.00 | -0.06 | -0.00 |
| 5 | S | -0.08 | -0.10 | -0.05 | -0.05 | -0.16 | 23 | S | -0.10 | -0.09 | -0.10 | -0.14 | -0.04 |
|   | C | -0.05 | -0.04 | -0.07 | -0.10 | -0.00 |    | C | -0.06 | -0.00 | -0.05 | -0.04 | -0.14 |
| 6 | S | -0.12 | -0.09 | -0.08 | -0.10 | -0.14 | 24 | S | -0.10 | -0.12 | -0.08 | -0.07 | -0.04 |
|   | C | -0.00 | -0.07 | -0.08 | -0.11 | -0.00 |    | C | -0.00 | -0.00 | -0.05 | -0.09 | -0.14 |
| 7 | S | -0.12 | -0.10 | -0.07 | -0.14 | -0.16 | 25 | S | -0.12 | -0.12 | -0.08 | -0.13 | -0.09 |
|   | C | -0.05 | -0.09 | -0.04 | -0.00 | -0.00 |    | C | -0.00 | -0.00 | -0.00 | -0.04 | -0.08 |
| 8 | S | -0.12 | -0.10 | -0.10 | -0.10 | -0.14 | 26 | S | -0.11 | -0.10 | -0.10 | -0.16 | -0.16 |
|   | C | -0.00 | -0.05 | -0.04 | -0.08 | -0.06 |    | C | -0.09 | -0.05 | -0.05 | -0.00 | -0.03 |
| 9 | S | -0.10 | -0.09 | -0.09 | -0.15 | -0.12 | 27 | S | -0.06 | -0.02 | -0.12 | -0.11 | -0.03 |
|   | C | -0.05 | -0.04 | -0.04 | -0.00 | -0.06 |    | C | -0.08 | -0.08 | -0.00 | -0.09 | -0.15 |
| 10 | S | -0.10 | -0.07 | -0.11 | -0.14 | -0.07 | 28 | S | -0.11 | -0.13 | -0.10 | -0.13 | -0.13 |
|    | C | -0.07 | -0.08 | -0.07 | -0.00 | -0.07 |    | C | -0.00 | -0.00 | -0.00 | -0.04 | -0.08 |
| 11 | S | -0.12 | -0.10 | -0.13 | -0.14 | -0.13 | 29 | S | -0.08 | -0.07 | -0.10 | -0.04 | -0.14 |
|    | C | -0.00 | -0.04 | -0.00 | -0.00 | -0.05 |    | C | -0.04 | -0.04 | -0.00 | -0.13 | -0.06 |
| 12 | S | -0.03 | -0.10 | -0.08 | -0.07 | -0.15 | 30 | S | -0.10 | -0.06 | -0.07 | -0.06 | -0.13 |
|    | C | -0.06 | -0.06 | -0.12 | -0.12 | -0.00 |    | C | -0.00 | -0.08 | -0.07 | -0.13 | -0.07 |
| 13 | S | -0.12 | -0.11 | -0.10 | -0.14 | -0.15 | 31 | S | -0.10 | -0.11 | -0.10 | -0.06 | -0.09 |
|    | C | -0.11 | -0.03 | -0.00 | -0.00 | -0.00 |    | C | -0.00 | -0.00 | -0.00 | -0.14 | -0.07 |
| 14 | S | -0.11 | -0.07 | -0.11 | -0.12 | -0.15 | 32 | S | -0.10 | -0.11 | -0.12 | -0.04 | -0.10 |
|    | C | -0.00 | -0.12 | -0.00 | -0.05 | -0.00 |    | C | -0.00 | -0.07 | -0.00 | -0.15 | -0.05 |
| 15 | S | -0.06 | -0.12 | -0.09 | -0.08 | -0.07 | 33 | S | -0.05 | -0.07 | -0.12 | -0.05 | -0.05 |
|    | C | -0.04 | -0.00 | -0.05 | -0.10 | -0.13 |    | C | -0.04 | -0.12 | -0.00 | -0.14 | -0.15 |
| 16 | S | -0.12 | -0.07 | -0.03 | -0.11 | -0.03 | 34 | S | -0.13 | -0.10 | -0.10 | -0.15 | -0.08 |
|    | C | -0.04 | -0.10 | -0.08 | -0.08 | -0.15 |    | C | -0.00 | -0.00 | -0.00 | -0.00 | -0.09 |
| 17 | S | -0.08 | -0.07 | -0.08 | -0.14 | -0.14 | 35 | S | -0.09 | -0.09 | -0.07 | -0.03 | -0.10 |
|    | C | -0.07 | -0.11 | -0.09 | -0.00 | -0.05 |    | C | -0.00 | -0.05 | -0.00 | -0.15 | -0.07 |
| 18 | S | -0.08 | -0.11 | -0.07 | -0.06 | -0.13 | 36 | S | -0.12 | -0.08 | -0.09 | -0.14 | -0.13 |
|    | C | -0.04 | -0.06 | -0.05 | -0.13 | -0.07 |    | C | -0.07 | -0.00 | -0.00 | -0.00 | -0.06 |

FIG.12

| No. | | C | R | L | U | D |
|---|---|---|---|---|---|---|
| 1 | S | -0.15 | -0.18 | -0.16 | -0.09 | -0.12 |
| | C | -0.09 | -0.04 | -0.06 | -0.19 | -0.16 |
| 2 | S | -0.12 | -0.14 | -0.19 | -0.05 | -0.17 |
| | C | -0.12 | -0.08 | -0.05 | -0.22 | -0.12 |
| 3 | S | -0.08 | -0.17 | -0.17 | -0.12 | -0.15 |
| | C | -0.16 | -0.00 | -0.05 | -0.14 | -0.11 |
| 4 | S | -0.19 | -0.19 | -0.19 | -0.19 | -0.07 |
| | C | -0.05 | -0.00 | -0.00 | -0.10 | -0.19 |
| 5 | S | -0.13 | -0.15 | -0.13 | -0.10 | -0.15 |
| | C | -0.10 | -0.06 | -0.06 | -0.15 | -0.12 |
| 6 | S | -0.09 | -0.18 | -0.12 | -0.05 | -0.08 |
| | C | -0.13 | -0.00 | -0.10 | -0.24 | -0.21 |
| 7 | S | -0.16 | -0.17 | -0.14 | -0.14 | -0.09 |
| | C | -0.05 | -0.00 | -0.09 | -0.17 | -0.20 |
| 8 | S | -0.15 | -0.12 | -0.18 | -0.09 | -0.07 |
| | C | -0.08 | -0.07 | -0.00 | -0.16 | -0.18 |
| 9 | S | -0.21 | -0.16 | -0.18 | -0.13 | -0.16 |
| | C | -0.00 | -0.04 | -0.09 | -0.16 | -0.11 |
| 10 | S | -0.13 | -0.18 | -0.17 | -0.10 | -0.14 |
| | C | -0.07 | -0.08 | -0.04 | -0.23 | -0.16 |
| 11 | S | -0.21 | -0.18 | -0.19 | -0.18 | -0.08 |
| | C | -0.00 | -0.00 | -0.04 | -0.12 | -0.17 |
| 12 | S | -0.14 | -0.16 | -0.17 | -0.13 | -0.11 |
| | C | -0.10 | -0.00 | -0.06 | -0.14 | -0.17 |
| 13 | S | -0.17 | -0.19 | -0.22 | -0.14 | -0.13 |
| | C | -0.07 | -0.00 | -0.00 | -0.12 | -0.15 |
| 14 | S | -0.21 | -0.20 | -0.20 | -0.19 | -0.11 |
| | C | -0.00 | -0.04 | -0.07 | -0.12 | -0.16 |
| 15 | S | -0.14 | -0.16 | -0.16 | -0.10 | -0.13 |
| | C | -0.09 | -0.00 | -0.05 | -0.20 | -0.18 |
| 16 | S | -0.10 | -0.22 | -0.17 | -0.10 | -0.11 |
| | C | -0.13 | -0.00 | -0.06 | -0.20 | -0.19 |
| 17 | S | -0.08 | -0.20 | -0.20 | -0.07 | -0.14 |
| | C | -0.13 | -0.00 | -0.00 | -0.22 | -0.17 |
| 18 | S | -0.13 | -0.16 | -0.17 | -0.09 | -0.14 |
| | C | -0.09 | -0.00 | -0.07 | -0.21 | -0.15 |
| 19 | S | -0.16 | -0.18 | -0.16 | -0.14 | -0.13 |
| | C | -0.06 | -0.00 | -0.09 | -0.14 | -0.16 |
| 20 | S | -0.16 | -0.19 | -0.17 | -0.16 | -0.14 |
| | C | -0.07 | -0.00 | -0.00 | -0.10 | -0.14 |
| 21 | S | -0.14 | -0.15 | -0.20 | -0.10 | -0.05 |
| | C | -0.09 | -0.05 | -0.00 | -0.17 | -0.22 |
| 22 | S | -0.11 | -0.19 | -0.19 | -0.12 | -0.11 |
| | C | -0.15 | -0.00 | -0.07 | -0.14 | -0.14 |
| 23 | S | -0.12 | -0.18 | -0.14 | -0.09 | -0.07 |
| | C | -0.09 | -0.00 | -0.05 | -0.21 | -0.17 |
| 24 | S | -0.13 | -0.20 | -0.17 | -0.08 | -0.14 |
| | C | -0.10 | -0.00 | -0.04 | -0.20 | -0.17 |
| 25 | S | -0.07 | -0.15 | -0.13 | -0.05 | -0.19 |
| | C | -0.14 | -0.05 | -0.07 | -0.24 | -0.10 |
| 26 | S | -0.11 | -0.19 | -0.19 | -0.07 | -0.08 |
| | C | -0.10 | -0.00 | -0.00 | -0.21 | -0.19 |
| 27 | S | -0.16 | -0.19 | -0.17 | -0.15 | -0.10 |
| | C | -0.05 | -0.00 | -0.06 | -0.16 | -0.22 |
| 28 | S | -0.18 | -0.19 | -0.21 | -0.16 | -0.14 |
| | C | -0.06 | -0.00 | -0.00 | -0.11 | -0.15 |
| 29 | S | -0.17 | -0.17 | -0.20 | -0.09 | -0.14 |
| | C | -0.07 | -0.05 | -0.00 | -0.19 | -0.14 |
| 30 | S | -0.13 | -0.20 | -0.18 | -0.17 | -0.04 |
| | C | -0.10 | -0.00 | -0.04 | -0.12 | -0.25 |
| 31 | S | -0.15 | -0.16 | -0.12 | -0.11 | -0.08 |
| | C | -0.06 | -0.00 | -0.05 | -0.16 | -0.17 |
| 32 | S | -0.15 | -0.14 | -0.14 | -0.11 | -0.08 |
| | C | -0.04 | -0.06 | -0.00 | -0.16 | -0.19 |
| 33 | S | -0.11 | -0.21 | -0.14 | -0.06 | -0.05 |
| | C | -0.10 | -0.00 | -0.00 | -0.20 | -0.22 |
| 34 | S | -0.11 | -0.17 | -0.17 | -0.08 | -0.06 |
| | C | -0.09 | -0.06 | -0.06 | -0.19 | -0.22 |
| 35 | S | -0.17 | -0.18 | -0.18 | -0.12 | -0.10 |
| | C | -0.05 | -0.05 | -0.00 | -0.16 | -0.17 |
| 36 | S | -0.14 | -0.18 | -0.15 | -0.13 | -0.08 |
| | C | -0.08 | -0.04 | -0.00 | -0.15 | -0.18 |

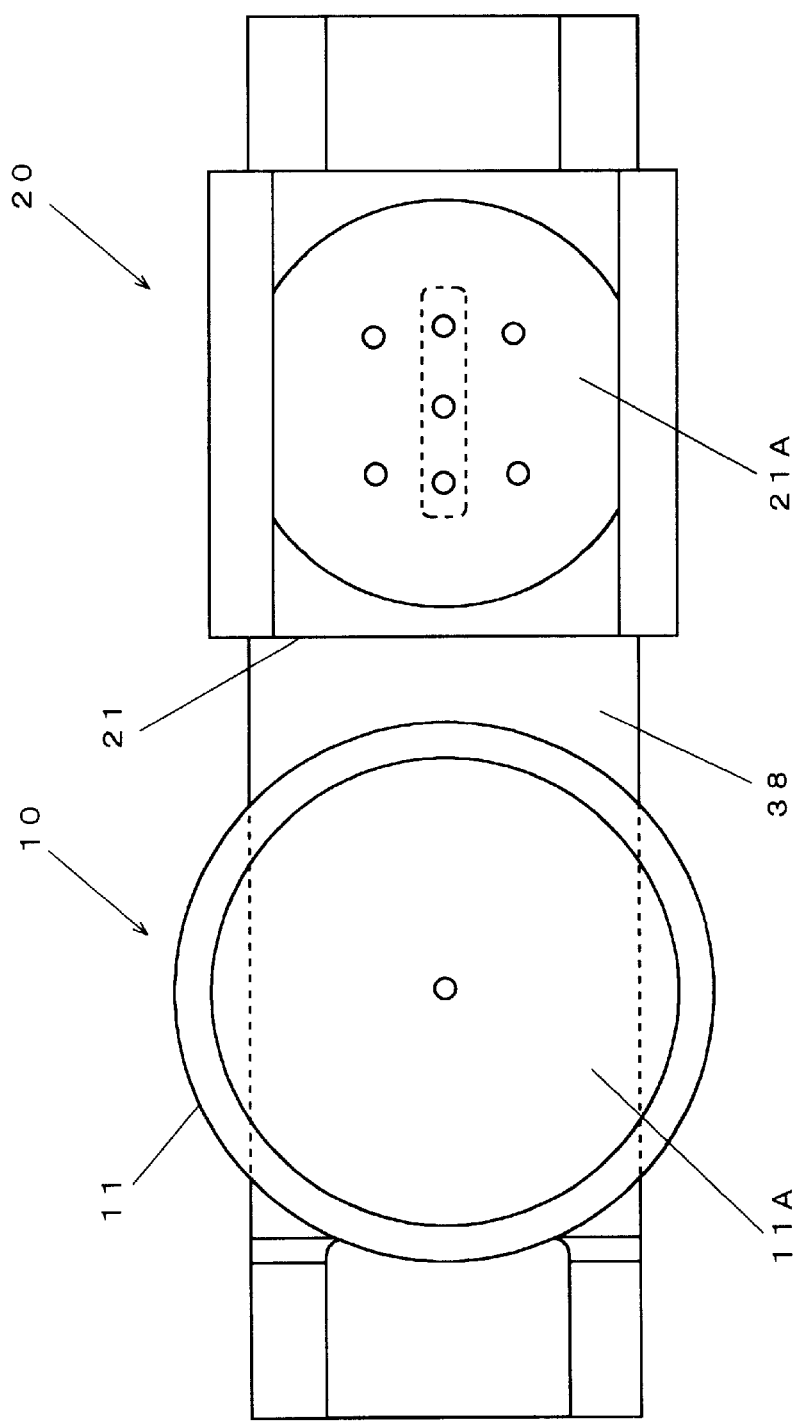

F I G. 1 8
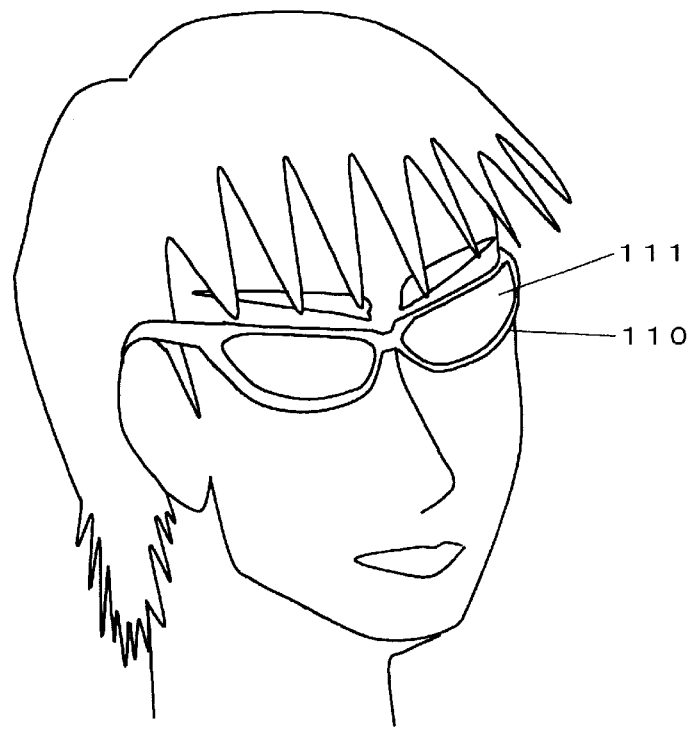
F I G. 1 9
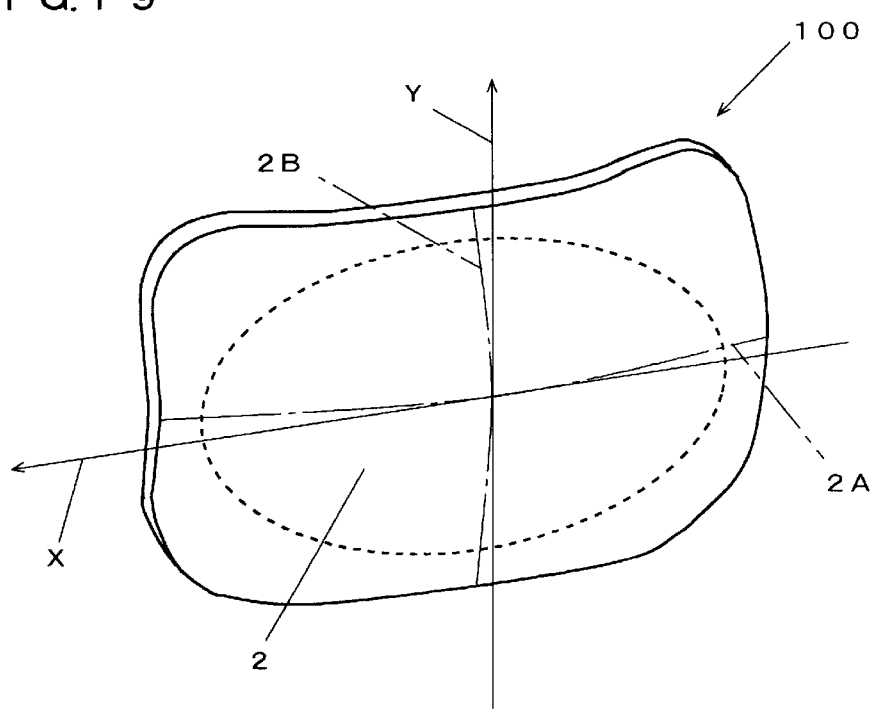

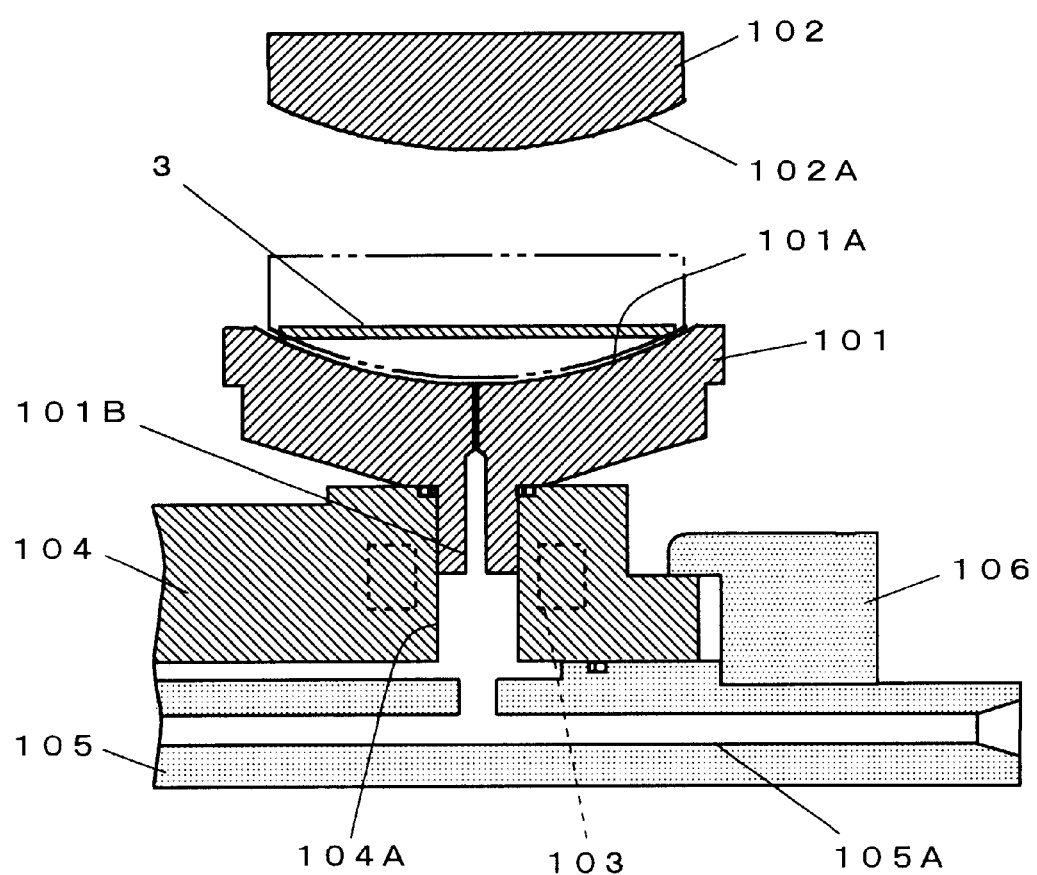
F I G. 2 0

POLARIZING LENS FOR SUNGLASSES, METHOD AND APPARATUS FOR PRODUCING SAID LENS

BACKGROUND OF THE INVENTION

The present invention relates to a polarizing lens mainly used for sunglasses and goggles. More particularly, this invention relates to a polarizing lens used for a sunglasses comprising a curved laminate which comprises a polarizing thin layer and supporting layers being made from polycarbonate-resin and formed on both surfaces of the thin layer, while the invention also relates to a method of producing said polarizing lens and an apparatus for executing the production method related thereto.

Conventionally, there are such sunglasses using polarizing lenses as the one shown in FIG. 18 for example. Taking fashionableness into account, the glasses exemplified in FIG. 18 are designed with a slim width. Both ends of a frame 110 are conspicuously curved by way of surrounding both sides of the bearer's face in order that the sunglasses not only functionally deal with front-directional incident light, but also deal with lateral-directional incident light as well. A pair of lenses 111 secured to the frame 110 are respectively formed with spherical surfaces, each having a small radius of curvature proportional to such a conspicuous curve provided for the frame 110.

In order to produce the above-preferred lens 111, initially, a polarizing lens 100 shown in FIG. 19 is produced from a laminate comprising a polarizing thin layer and supporting layers made from polycarbonate-resin and formed on both surfaces of the thin layer, via steps of pressing the laminate by applying a trimming die to form as a rectangular sheet, and curving the rectangular laminate. Next, the produced polarizing lens 100 are cut into the shape of the frame 110 as per dotted-line shown in FIG. 19 and a lens 111 fitting in with the frame 110 are eventually formed.

A pair of polarizing lenses 100 correctly fitting in with the curved sunglasses shown in FIG. 18, have spherical curved surfaces 2, each surface is so formed that curve 2A along the direction X of the polarizing axis and curve 2B along the direction Y being orthogonal to the polarizing axis are respectively 8R. 1R means that radius of curvature is 523 mm, and this numerical value designating degree of curvature "R" is inversely proportional to radius of curvature. Accordingly, the greater the radius of curvature, the gentler is the curve. Conversely, the greater the numerical value designating curvature, the sharper is the curve.

FIG. 20 exemplifies a method of producing a conventional polarizing lens 100 having an 8R×8R curved surface 2. In FIG. 20, the reference numeral 101 designates a lower mold having a concave surface 101A corresponding to the 8R×8R curved surface 2. The reference numeral 102 designates an upper mold having a convex pressing surface 102A correctly matching the form of the concavity of the surface 101A. The lower mold 101 is secured onto upper and lower supporting bases 104 and 105 and is subject to heating by a heater 103 built in the supporting base 104. The lower mold 101, supporting bases 104 and 105 are respectively provided with air-absorbing holes 10B, 104A, and 105A for sucking up a molded object by operating absorptive force inside of the concavity of the surface 101A of the mold 101. In addition, the reference numeral 106 shown in FIG. 20 designates a fixing member for integrally securing the upper-and-lower supporting bases 104 and 105.

In order to form a lens 100, initially, the lower mold 101 is heated at 143~144° C. by operating the heater 103, and then a laminate 3 is horizontally set onto the surface 101A. In order to facilitate curving work, the laminate 3 is preheated by hot air heated at 140° C. for 5 minutes until the laminate 3 itself is heated to 110° C. Next, the upper mold 102 is lowered while operating absorptive force to the concave surface 101A by operating a vacuum unit (not being illustrated), the laminate 3 is curved between the pressing surface 102A of the upper mold 102 and the surface 101A of the lower mold 101. Next, while rising up the upper mold 102 with maintaining the absorption-activated state inside of the concavity of the surface 101A, shape of the molded object is stably formed via thermal treatment at 160° C. for approximately 5 minutes. Consequently, a polarizing lens 100 provided with an 8R×8R curved surface 2 is completed. Finally, the completed lens 100 is drawn out of the concave surface 101A of the lower mold 101.

Nevertheless, in the case of the conventional polarizing lens 100 having an 8R×8R curved surface 2, substantial difference is generated between the curvature of the front-side supporting layer and the curvature of the backside supporting layer to cause refractive power of light to increase to generate substantial distortion in the lens. When using sunglasses made of the above-cited polarizing lenses 100, bearer's eyes will incur adverse effect. Refractive power of light can be contracted by way of minimizing difference between the curvature of the surface-side supporting layer and the curvature of the back-side supporting layer by restraining curved surface 2 of the polarizing lens 100 to be 6R×6R for example. On the other hand, if the curvature of the curved surface 2 were contracted, curve of the lens 111 become gentle to generate difficulty to properly fit in the lens 111 with the frame 110 having a conspicuous curved form as shown in FIG. 18.

SUMMARY OF THE INVENTION

The invention has been achieved to fully solve the above problem. The object of the invention is to provide a novel polarizing lens usable for sunglasses for minimizing refractive index of light and fixing with a frame having conspicuous curve via the reformation of a curved surface of the lens into a non-spherical curved surface with consideration of the direction of polarizing axis. Conjunctionally, the invention also aims to provide a novel method of producing the above polarizing lens and an apparatus for implementing the method related to the invention.

An embodiment of polarizing lens related to the invention, comprises a curved laminate which has a polarizing thin layer and supporting layers made from polycarbonate-resin being laminated on both surfaces of the thin layer; and said laminate is formed as a oblong in which polarizing axis is corresponded to the cross direction thereof, and comprises a non-spherical curved surface whose curve along the direction of polarizing axis is sharper than curve along the direction orthogonal to said polarizing axis.

According to the polarizing lens having the above structure, by virtue of provision of such a non-spherical curved surface in which curve along the direction of polarizing axis is sharper than that along the direction orthogonal to the polarizing axis, refractive index of light can securely be minimized. Further, the polarizing lens related to the invention can securely be fitted in with a glass-frame having a conspicuously curved shape, and it can properly deal with light being incident upon lateral sides.

According to an embodiment of the inventive method for producing a polarizing lens for sunglasses, a step of curving a laminate to mold a intermediate product having a curved surface, and a step of curving the intermediate product to mold a final product which has a curved surface having different curvature from that of the intermediate product are executed; said laminate has a polarizing thin layer and supporting layers made from polycarbonate-resin is laminated on both surfaces of the thin layer and is formed as a oblong in which polarizing axis is corresponded to the cross direction thereof; and the curved surface of the final product is formed non-spherical so that curve along the direction of polarizing axis is sharper than curve along the direction orthogonal to said polarizing axis. By virtue of executing the first and secondary steps in series, such a satisfactory polarizing lens featuring minimized refractive index of light and minimized distortion of lens can securely be produced.

According to a preferred embodiment, in the first step for producing the intermediate product, the product is so formed as to have a spherical curved surface whose curve along the direction of polarizing axis is gentler than that of said final product and curve along the direction orthogonal to said polarizing axis is sharper than that of said final product.

According to the above-referred method, owing to the first step, when executing the secondary curving process against the intermediate product molded in the first step, curve along the direction orthogonal to the polarizing axis can be contracted by sharpening curve along the direction of the polarizing axis, thus making it possible to easily curve the intermediate product. Accordingly, such a lens having a non-spherical curved surface capable of minimizing distortion of lens can readily be produced.

And an embodiment of the invention related to an apparatus for producing a polarizing lens a preheating unit for preheating laminates, each of the laminates having a polarizing thin layer and supporting layers made from polycarbonate-resin being laminated on both surfaces of the thin layer, and being formed as a oblong in which polarizing axis is corresponded to the cross direction thereof; and a molding unit. The molding unit comprises a preliminary molding device for curving the laminates preheated by said preheating unit to mold intermediate products, a finishing device for curving said intermediate products to mold final products, and a shifting unit for shifting said intermediate products from said preliminary molding device to said finishing device, wherein the intermediate product is so formed as to have a spherical curved surface whose curve along the direction of polarizing axis is gentler than that of said final product and curve along the direction orthogonal to said polarizing axis is sharper than that of said final product, and the final product is so formed as to have a non-spherical curved surface whose curve along the direction of polarizing axis is sharper than curve along the direction orthogonal to said polarizing axis.

When producing polarizing lens by using the above-described apparatus, laminates are preheated by the preheating unit and then subject to a curving process via the molding unit. In the molding unit, the respective laminate are molded into the intermediate products, and are shifted to the finishing device by the shifting unit, to being molded into the final products. Thus making it possible to effectively and consecutively produce polarizing lenses.

BRIEF DESCRIPTION OF THE DRAWINGS

FIG. 1 is a perspective view of a polarizing lens according to an embodiment of the invention;

FIG. 2 is a plane view designating curvature of the polarizing lens shown in FIG. 1;

FIG. 3 is a lateral view designating curvature of the polarizing lens shown in FIG. 1;

FIG. 4 is a perspective view designating external appearance of a laminate used for polarizing lenses;

FIG. 9 is a view of measured data of sphere power tolerance and cylinder power tolerance of the polarizing lenses produced via the sequential steps shown in FIG. 8;

FIG. 11 is a view showing examples of contrast of measured data of sphere power tolerance and cylinder power tolerance;

FIG. 12 is a view showing measured data of sphere power tolerance and cylinder power tolerance of conventional polarizing lenses;

FIG. 17 is a plane view designating lower molds of the preliminary molding device and the finishing device;

FIG. 18 is a perspective view designating appearance of a pair of sunglasses incorporating polarizing lenses;

FIG. 19 is a perspective view designating appearance of a conventional polarizing lens; and FIG. 20 is a sectional view designating a method of producing the conventional polarizing lens.

DETAILED DESCRIPTION OF THE INVENTION

Figure 5:
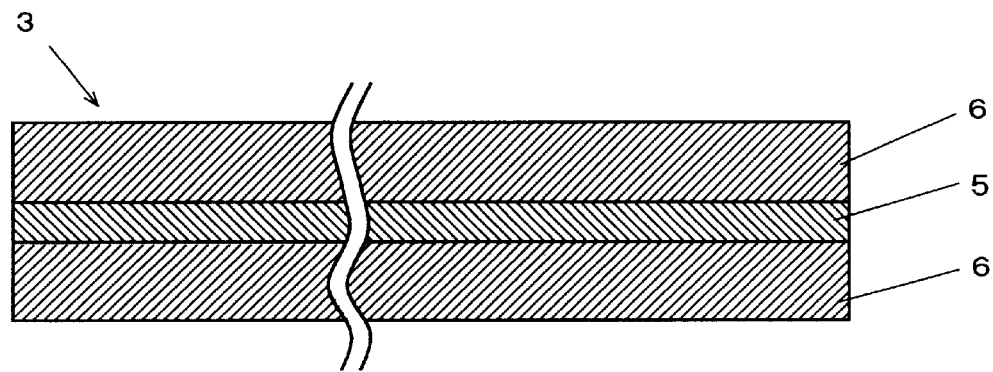
FIG. 5 is an enlarged sectional view of structure of the laminate shown in FIG. 4.

FIGS. 1 through 3 respectively exemplify appearance of a polarizing lens 1 usable for a pair of sunglasses according to an embodiment of the invention.

The exemplified polarizing lens 1 has a curved surface 2 comprising a concave back-surface and a convex front-surface. The curved surface 2 is formed as non-spherical so that curve 2A along the direction X of the polarizing axis is sharper than curve 2B along the direction Y orthogonal to the polarizing axis. In this embodiment, curve 2A along the direction X of the polarizing axis is designed to be 8R, whereas curve 2B along the direction Y orthogonal to the polarizing axis is designed to be 5R.

As shown in FIG. 4, the polarizing lens 1 is formed by curving a laminate 3 being formed as a oblong in which the direction X of the polarizing axis is corresponded to the cross direction of the laminate 3. The laminate 3 according to this embodiment has 82 mm of length DX in the direction X and 50 mm of length DY in the direction Y. By effecting a pressing process against a laminate 3 having 270 mm×361 mm of dimension with a trimming die, the laminate 3 is formed into a rectangular shape having circular-arc portions 4 in four corners. The form of the laminate 3 is not always needed to be a rectangle, but elliptic form may also be used.

As shown in FIG. 5, the laminate 3 comprises a polarizing thin layer 5 and a pair of supporting layers 6 and 6 laminated on both surfaces of the layer 5. The laminate 3 is provided with 0.5~2.5 mm of thickness suited for curving. The polarizing thin layer 5 comprises dichroism pigment disposed on high-polymer film such as polyvinylalcohol for example. In this embodiment, the polarizing thin layer 5 has 0.05 mm of thickness, whereas each of the supporting layers 6 has 0.7 mm of thickness.

Figure 6:
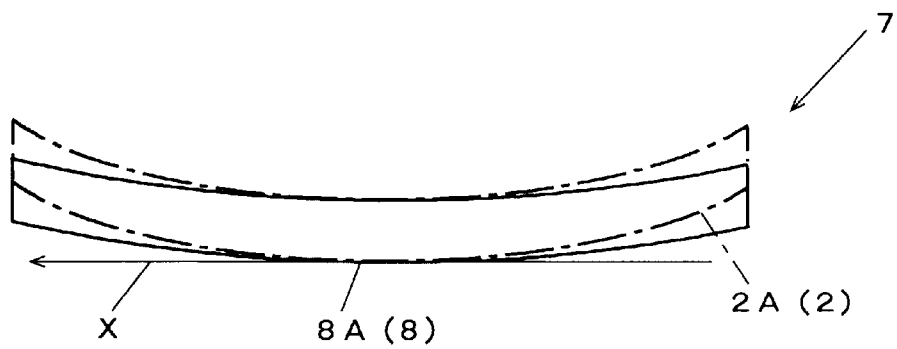
FIG. 6 is a plane view designating degree of curvature of intermediate product.
Figure 7:
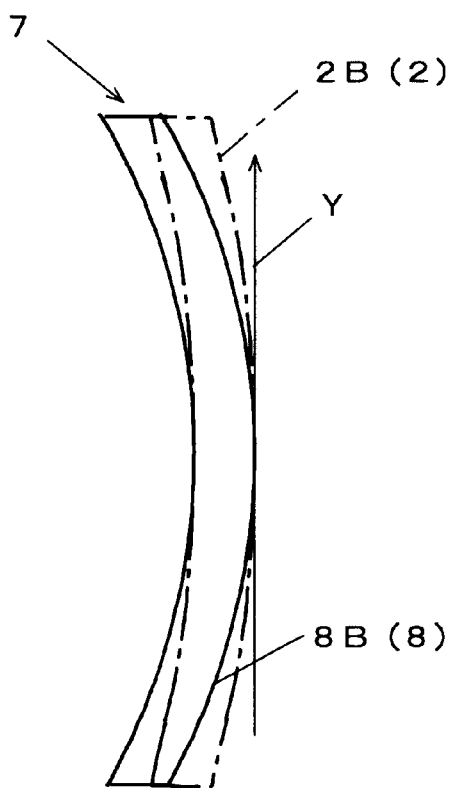
FIG. 7 is a lateral view designating degree of curvature of intermediate product.
Figure 8A:
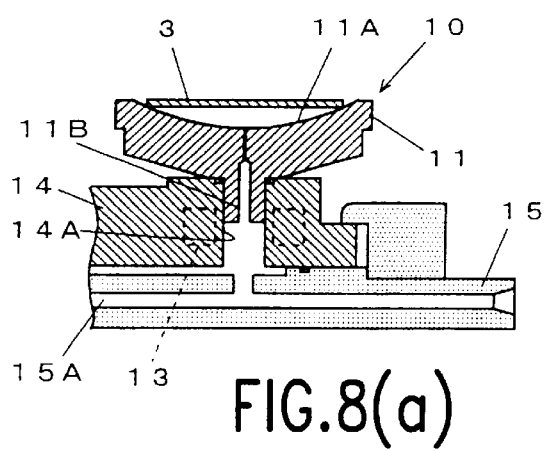
FIGS. 8(a) to 8(e) are sectional view for explanatory of steps for producing the polarizing lens is per the embodiment of the invention.
Figure 8D:
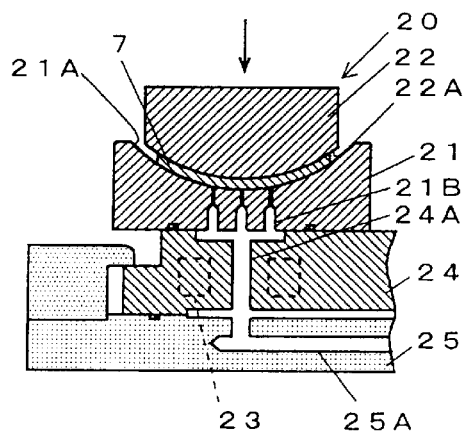
Figure 8B:
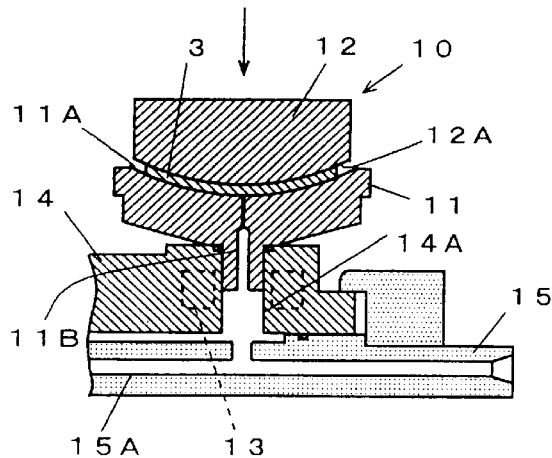
Figure 8E:
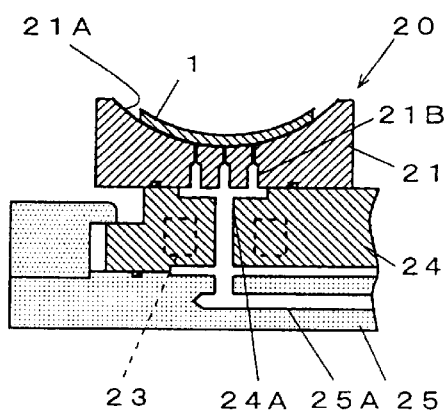
Figure 8C:
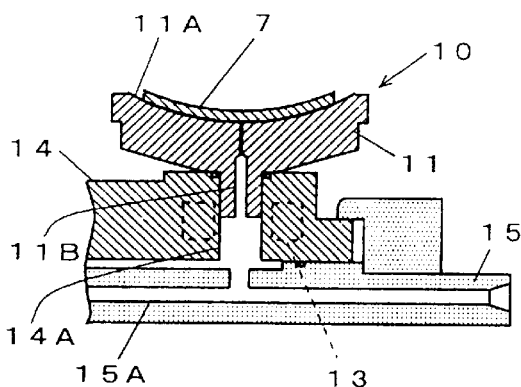

According to this embodiment, in order to produce the polarizing lens 1 shown in FIG. 1 by curving the laminate 3, initially, the laminate 3 is treated with a first curving process to form an intermediate product 7 as shown in FIGS. 6 and 7 via solid line. The intermediate product 7 has a curved surface 8 with a curvature being different from that of final product whose curved surface 2 is designated by dot-chained-line.

The intermediate product 7 is provided with spherical curved surface 8, where the curvature of curve 8A along the direction X of the polarizing axis is set to be 6R being less than 8R of curve 2A of the final product, whereas the curvature of curve 8B along the direction Y orthogonal to the polarizing axis is set to be 6R being greater than 5R provided for curve 2B of the final product.

After molding the intermediate product 7 via the first curving process, a secondary curving process is executed against the product 7 to eventually complete the final product, i.e., the non-spherical polarizing lens 1 having the 8R×5R curved surface.

The first and second curving processes have been executed step wise against the laminate 3 in the above embodiment. This is because better result in terms of measured data on the lens-distortion was yielded by stepwise execution of double processes compared to the case of producing such a non-spherical polarizing lens 1 having 8R×5R curved surface generated via a single curving process. Detailed measured data will be described later on.

Curvature of curve 8A along the axis X of the curved surface 8 of the intermediate product 7 was set to be less than that of the final product, whereas curvature of curve 8B along the axis Y was set to be greater than that of the final product. This is solely because, if curvature of curve 8A were raised from 6R to 8R in the secondary process, rebounding force to cause curvature to lower itself will act on curve 8B, whereby facilitating shift of curve 8B from 6R to 5R without executing excessive force.

FIGS. 8(*a*) to 8(*e*) exemplify exemplifies practical methods for producing the polarizing lens 1 by implementing the first and second curving processes.

FIGS. 8(*a*) through (3) in FIG. 8 respectively exemplify the first-step curving process using a preliminary molding device 10. The preliminary molding device 10 comprises a lower mold 11 having a concave surface 11A corresponding to the 6R×6R curved surface 8 of the intermediate product 7 and an upper mold 12 having a convex pressing surface 12A correctly matching the form of the concavity of the surface 11A. The lower mold 11 is held on upper and lower supporting bases 14 and 15, and a heater 13 for heating the lower mold 11 is built in the supporting base 14. The lower mold 11 and the supporting bases 14 and 15 are respectively provided with air-absorbing holes 11B, 14A, and 15A, for absorbing a molded object by operating absorptive force to the surface 11A of the lower mold 11.

FIGS. 8(*d*) and 8(*c*) respectively exemplify the secondary curving process executed by the finishing device 20. The finishing device 20 comprises a lower mold 21 having a concave surface 21A corresponding to the 8R×5R curved surface 2 of the polarizing lens 1 being the final product and an upper mold 22 having a convex pressing surface 22A compatible with the form of the concavity of the surface 21A. The lower mold 21 is held on supporting bases 24 and 25, and a heater 23 for heating the lower mold 21 is built in the supporting base 24. The lower mold 21 and the supporting bases 24 and 25 are respectively provided with air-absorbing holes 21B, 24A, and 25A, for absorbing a molded object by operating absorptive force to the surface 21A of the lower mold 21.

Initially, the heater 13 is operated to heat the lower mold 11 of the preliminary molding device 10 up to 143~144° C. to hold on this temperature. Next, the laminate 3 is horizontally set onto the surface 11A of the lower mold 11 as shown in FIG. 8(*a*). The laminate 3 has been preheated via exposure to hot air at 140° C. for about 5 minutes to raise own temperature up to 110° C., in order that the curving process can easily be executed. Next, as shown in FIG. 8(*b*), the upper mold 12 is lowered while operating absorptive force to the surface 11A by operating a vacuum device (not shown), the laminate 3 is curved between the pressing surface 12A of the upper mold 12 and the concave surface 11A of the lower mold 11. While the curving process is underway, the upper mold 12 generates 50~60 kg of load. Next, while preserving the state of activating absorptive force inside of the concavity of the surface 11A the upper mold 12 is lifted, and then, the form of the molded object is stabily formed by being exposed to hot air at 155° C. for about 5 minutes as shown in FIG. 8(*c*). Consequently, the intermediate product 7 having 6R×6R curved surface 8 is properly molded, which is then drawn out of the lower mold 11.

Next, the intermediate product 7 is oriented and secured inside of the concavity of the surface 21A of the lower mold 21 of the finishing device 20 heated at 138° C. by the heater 23, and the upper mold 22 is lowered with activating absorptive force to the surface 21A to curve the product 7 between the pressing surface 22A of the upper mold 22 and the concave surface 21A of the lower mold 21 as shown in FIG. 8(*d*). While the process is underway, the upper mold 22 generates 50~60 kg of load. Next, while preserving the state of activating absorptive force inside of the concavity of the surface 21A, the upper mold 22 is lifted, and then the form of the molded object is stabilized by way of being exposed to hot air at 150° C. for about 5 minutes as shown in FIG. 8(*e*). Consequently, a polarizing lens 1 having 8R×5R curved surface 2 is molded, which is then drawn out of the lower mold 21.

FIG. 9 designates measured data related to distortion of the curved surface 2 of polarizing lenses 1 produced by executing the method exemplified in FIG. 8.

The reference numerals 1 through 36 respectively designate samples of the polarizing lenses 1. The character S designates sphere power tolerance, whereas C designates cylinder power tolerance, which are respectively such data designating degree of distortion of the curved surface of a lens. The lower the values of S and C, the lower is the distortion. Negative code shown in respective data values designates concave lenses.

Figure 10:
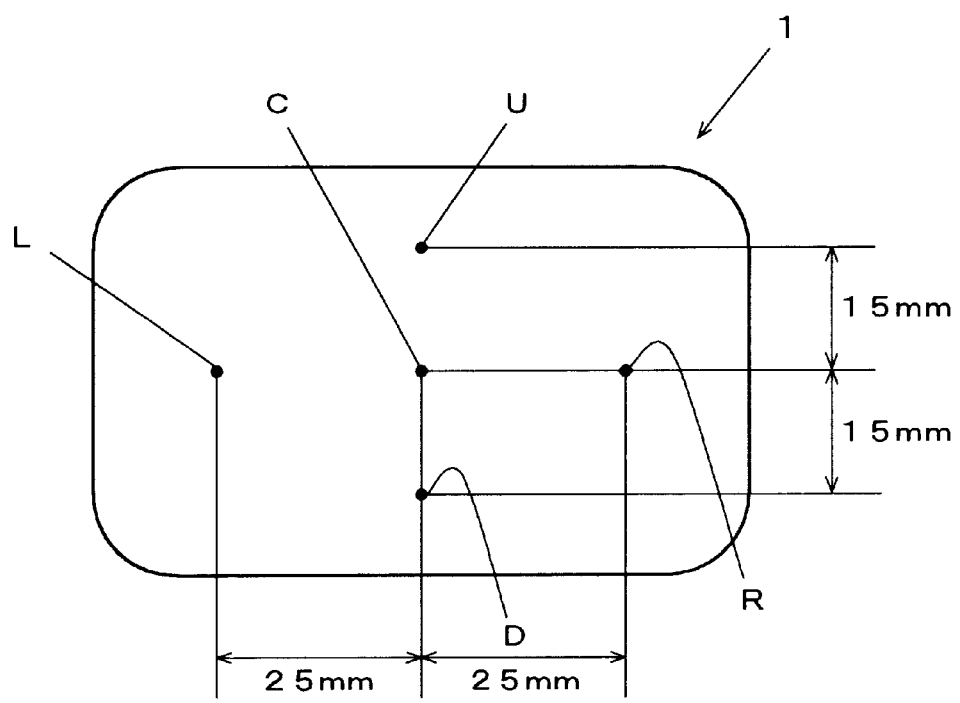
FIG. 10 is a view showing measuring points used for measuring sphere power tolerance and cylinder power tolerance.

As shown in FIG. 10, the measured data relate to the center position C of the polarizing lens 1, the right-end position R being away from the center position C to the right by 25 mm, the left-end position L being away from the center position C to the left by 25 mm, the upper position U being away from the center position C to the upside by 15 mm, and the lower position D being away from the center position C to the downside by 15 mm. All the data were measured by operating a computerized lens-meter CL-2000, made by TOPCON Corporation.

FIGS. 11 and 12 respectively designate measured data for comparison to those measured data shown in FIG. 10. FIG. 11 designates a measured data related to such polarizing lenses each having an 8R×5R curved surface produced via a single curving process. FIG. 12 designates measured data related to conventional polarizing lenses each having an 8R×8R curved surface produced via a single curving process.

Assume that reference value of the sphere power tolerance S and the cylinder power tolerance C are ±0.12 respectively, then, substantially one-half the measured data related to the conventional polarizing lenses shown in FIG. 12 exceeds the reference value. In terms of the polarizing lens finished via a single curving process shown in FIG. 11, measured data at the upper position U and the lower position D very often exceeded the reference value, however, measured data in the rest of positions were rated to be below the reference value. In regard to the polarizing lens finished via double curving processes shown in FIG. 9, there is no measured data in excess of the reference value. In FIGS. 11 and 12, values in excess of the reference of tables are faintly masked.

Figure 13A:
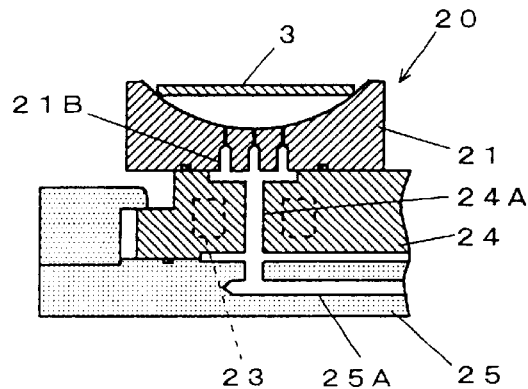
FIGS. 13(a) to 13(c) are sectional view explaining the method of producing one of the polarizing lenses related to the measured data shown in FIG. 11.
Figure 13B:
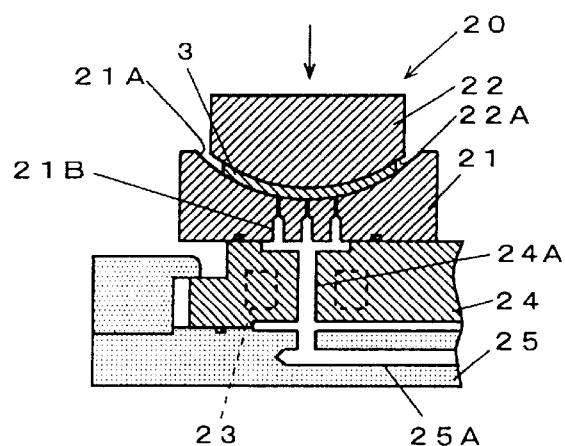
Figure 13C:
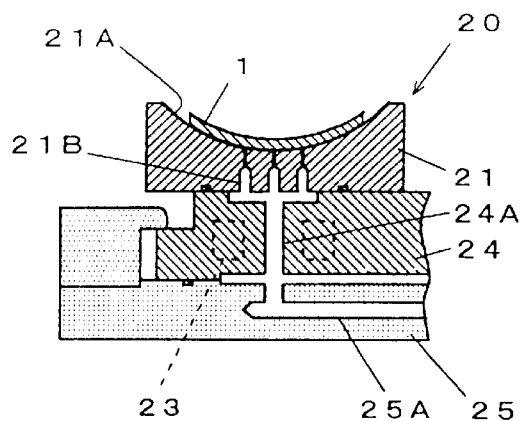

FIGS. 13(a), 13(b) and 13(c) designate a method for producing a polarizing lens having an 8R×5R curved surface via a single curving process.

In FIGS. 13(a) to 13(c) the reference numeral 21 designates a lower mold having a concave surface 21A corresponding to the 8R×5R curved surface of the polarizing lens. The reference numeral 22 designates an upper mold having a convex pressing surface 22A correctly matching the form of the concave surface 21A. The lower mold 21 and the upper mold 22 are exactly identical to the corresponding molds 21 and 22 of the finishing device 20 used for the above-described method via execution of double curving processes. The lower mold 21 is held on a pair of supporting bases 24 and 25 and heated by heater 23 built in the supporting base 24. The lower mold 21 and the supporting bases 24 and 25 are respectively provided with air-absorbing holes 21B, 24A, and 25A for absorbing a molded object by operating absorptive force to the surface 21A of the lower mold 21.

As shown in FIG. 13(a), initially, the lower mold 21 is heated up to 141°~142° C. by operating the heater 23, to hold on this temperature, and then, a laminate 3 is horizontally disposed on the surface 21A of the lower mold 21. The laminate 3 has been preheated by hot air at 140° C. for about 5 minutes until temperature of the laminate 3 reaches 110° C., to facilitate curving process. Next, the upper mold 22 is lowered with activating absorptive force to the concave surface 21A, the laminate 3 is curved between the pressing surface 22A of the upper mold 22 and the concave surface 21A of the lower mold 21 as shown in FIG. 13(b). While the process is underway, the upper mold 22 generates 50~60 kg of load. Next, the upper mold 22 is lifted with preserving the state of activating absorptive force to the concave surface 21A, and then, the laminate 3 is thermally treated with hot air at 157° C. for about 5 minutes so that the form thereof can be stabilized as shown in FIG. 13(c). In consequence, a polarizing lens having an 8R×5R curved surface 2 is properly formed, which is then drawn out of the lower mold 21.

Figure 14:
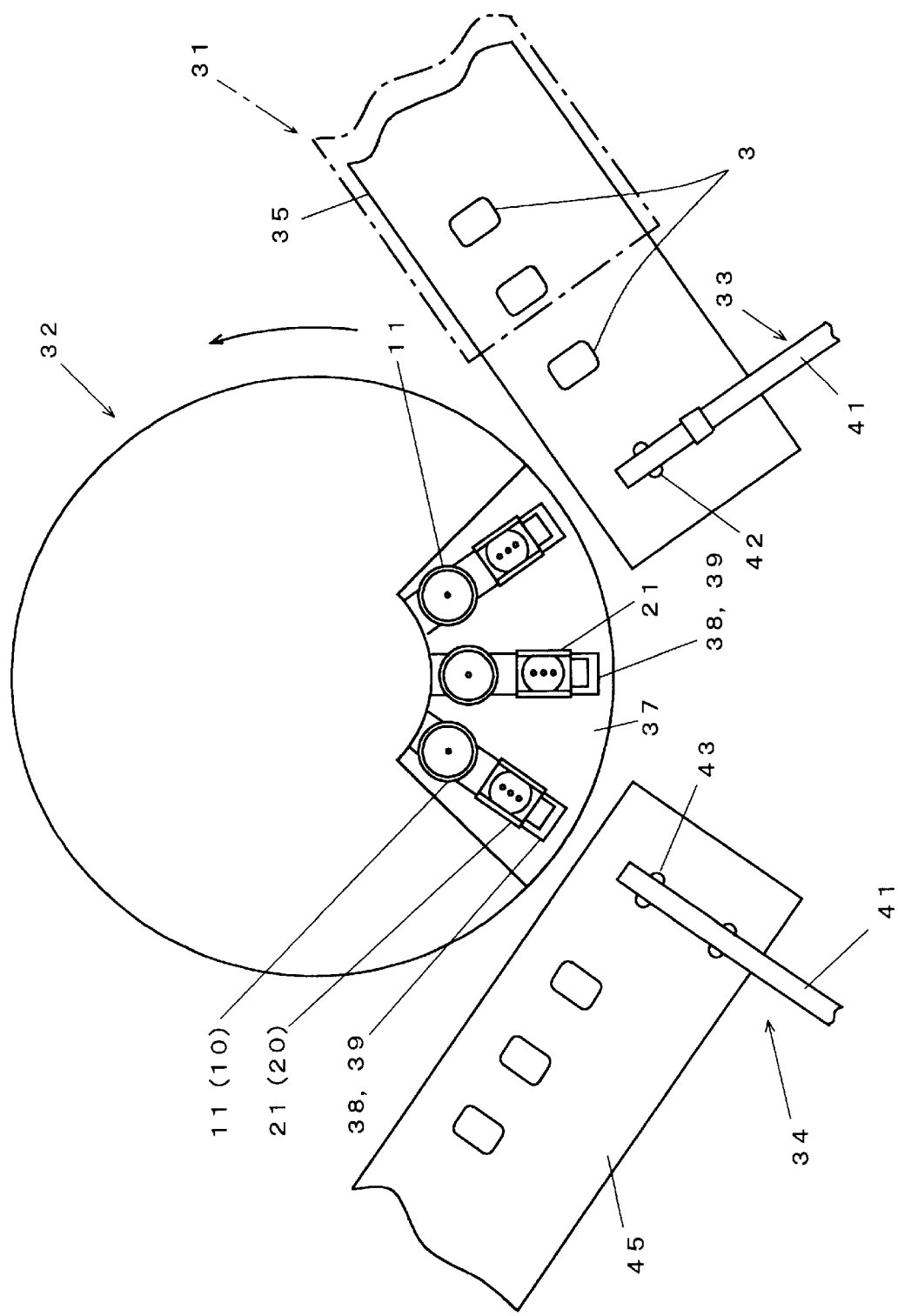
FIG. 14 is a plane view of a concrete example of main components of the apparatus for producing polarizing lenses.
Figure 15:
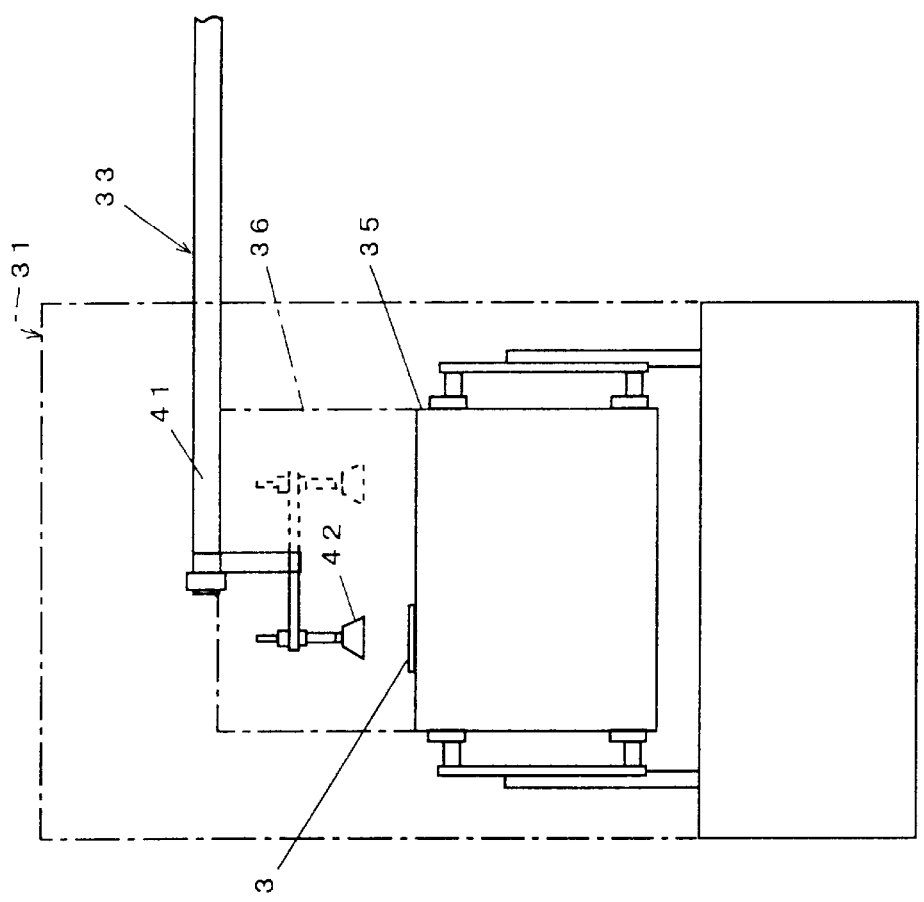
FIG. 15 is a lateral view of a concrete example of main components of the apparatus shown in FIG.14.
Figure 15:
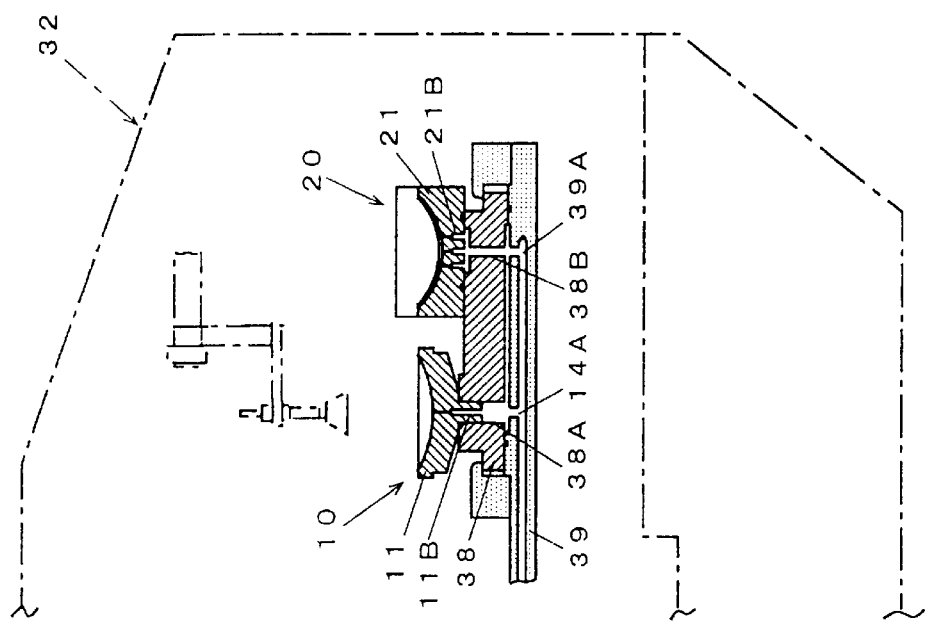

FIGS. 14 and 15 respectively exemplify a concrete example of an apparatus for producing the inventive polarizing lens needed for executing the method shown in FIGS. 8(a) to 8(e).

The apparatus comprises the following; a preheating unit 31 for conveying properly-aligned plural laminates 3 with preheating them, a molding unit 32 for properly curving the preheated laminates 3 to form polarizing lenses 1 each having a non-spherical curved surface 2, a supplying unit 33 for supplying the respective laminates 3 from the preheating unit 31 to the molding unit 32, and a shifting unit 34 for drawing the molded polarizing lenses 1 out of the molding unit 32 and shifting them to a collecting conveyor 45.

The preheating unit 31 comprises a conveyor 35 and a heating furnace 36 disposed by way of covering the conveyor 35, in which the laminates 3 are preheated up to 110° C. while being conveyed by the conveyor 35.

The molding unit 32 is disposed on the downstream-side of the conveyor 35, whereas the supplying unit 33 is disposed between the downstream-end of the conveyor 35 and the molding unit.

The molding unit 32 comprises a turntable 37 and a plurality pairs of upper and lower supporting bases 38 and 39 which are circularly secured at every isogonic position of turntable 37. Each of the supporting bases 38 is provided with a lower mold 11 of the preliminary molding device 10 at a position close to the center of the upper surface thereof, and the lower mold 21 of the finishing device 20 at the position outside of the lower mold 11. And as shown in FIG. 16, an upper mold 12 of the preliminary molding device 10 and an upper mold 22 of the finishing device 20 are respectively disposed above lower molds 11 and 21 disposed at a specific angular position so that the both molds 12 and 22 can be lifted and lowered.

The turntable 37 intermittently rotates itself, and the respective pairs of lower molds 11 and 21 of the preliminary molding device 10 and finishing device 20 are shifted in order to the position below the upper molds 12 and 22. Each upper supporting base 38 incorporates a heater (not shown) for heating the lower molds 11 and 21, and the supporting base 38 and 39 are respectively provided air-absorbing holes 38A, 38B, and 39A, which are interlinked with air-absorbing holes 11B and 21B formed in the lower molds 11 and 21. The air-absorbing hole 39A is connected to a vacuum device not being illustrated.

Figure 16:
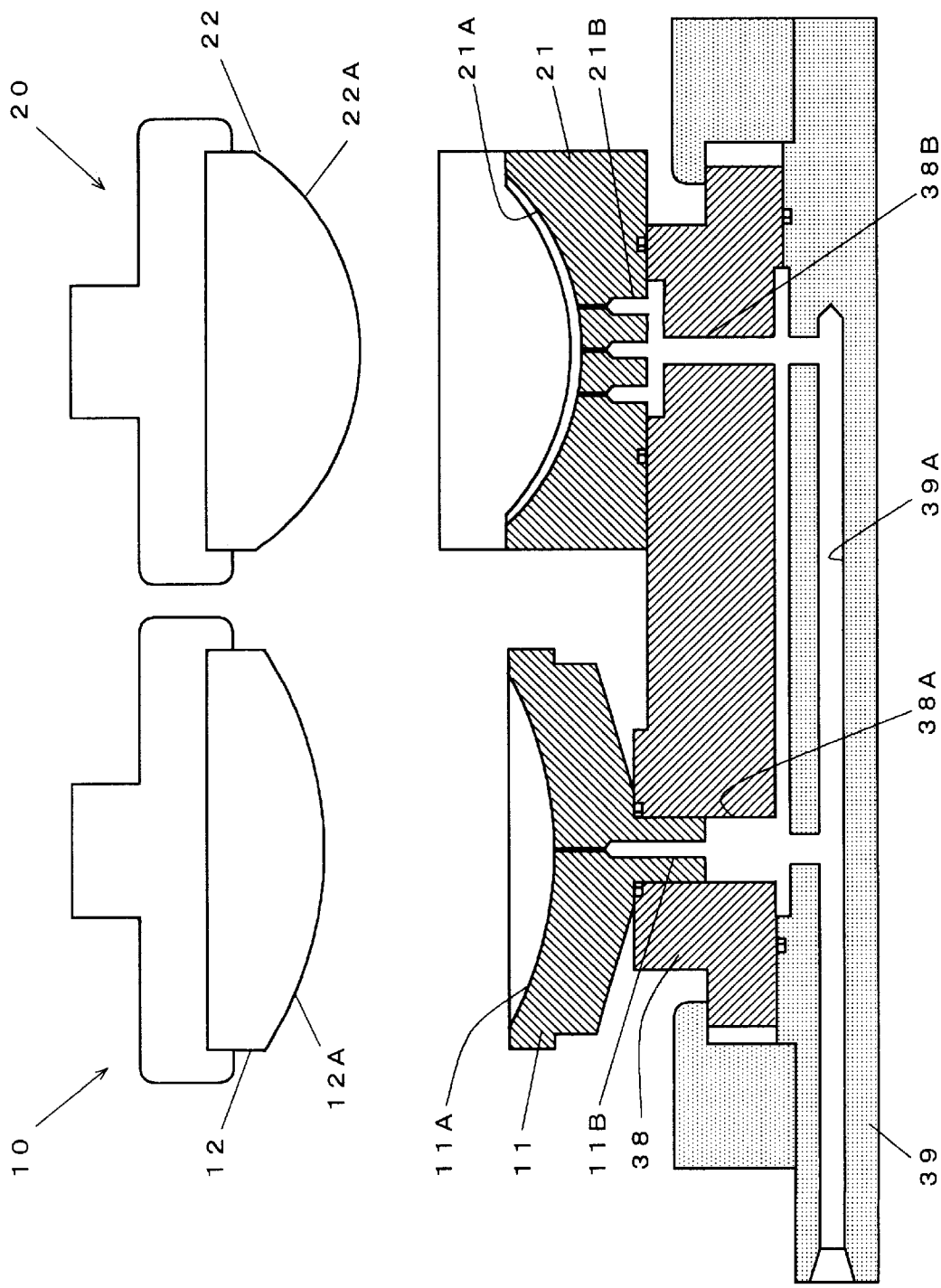
FIG. 16 is a sectional view designating structure of the molding unit.

As shown in FIGS. 16 and 17, each lower mold 11 of the preliminary molding device 10 has concave surface 11A corresponding to the 6R×6R curved surface 8 of intermediate product 7, and the upper mold 12 has a convex pressing surface 12A correctly matching the form of the concavity of the surface 11A. Further, each lower mold 21 of the finishing device 20 has a concave surface 21A corresponding to the 8R×5R curved surface 2 of the polarizing lens (final product) 1 and the upper mold 22 has a convex pressing surface 22A correctly matching the form of the concavity of the surface 21A.

In the supplying unit 33, a reciprocating unit 41 is secured to a lifting unit (not shown), where an absorbing unit 42 is secured downward, to the tip portion of the reciprocating unit 41. The laminates 3 are suck up from the conveyor 35 by the absorbing unit 42 and placed onto the lower mold 11 of the preliminary molding device 10, while the up/down movement of the lifting unit and the recipocation of the reciprocating unit 41.

The shifting unit 34 has the same structure as the supplying unit 33, in which a reciprocating unit 44 is secured to a lifting unit (not shown), and an absorbing unit 43 is secured downward, to the tip portion of the reciprocating unit 44. Relative to the up/down movement of the lifting unit and the reciprocation of the reciprocating unit 44, the shifting unit 34 picks up the molded laminate 3 from a lower mold 21 of the finishing device 20 and then place the laminate 3 onto the collecting conveyor 45. Further, the shifting unit 34 in this embodiment conjunctionally functions as a transfer unit for transferring intermediate product 7 held on a lower mold 11 of the preliminary molding device 10 onto the adjacent lower mold 21 of the finishing device 20. The shifting unit 34 as well as the preliminary molding device 10 and the finishing device 20 are involved in the molding unit 32.

Although not being illustrated, the molding unit 32 incorporates a hot-air-feeding unit for causing the lower molds 11 and 21 to be exposed to hot air at 140° C. fed therefrom.

When producing polarizing lenses 1 via the above-described apparatus, laminates 3 are consecutively fed to the upstream-end of the conveyor 35 of the preheating unit 31. The laminates 3 are preheated to 110° C. by the heating furnace 36 while being conveyed via the conveyor 35, and further conveyed to the supplying unit 33.

The supplying unit 33 picks up laminates 3 in order at the downstream-end of the conveyor 35 and then transports them to the molding unit 32 to place them on the lower molds 11 of the preliminary molding device 10. Next, the upper mold 12 of the preliminary molding device 10 descends to effect the initial curving process by pressing the laminate 3 with 50~60 kg of load between the upper mold 12 and the corresponding lower mold 11. Accordingly, an intermediate product 7 is molded, which is provided with a spherical 6R×6R curved surface 8 in which curve along the direction of the polarizing axis is gentler than that of the final product and curve along the direction orthogonal to the polarizing axis is sharper than that of the final product. In the course of the initial curving process, absorptive force is activated inside of the concavity of the surface 11A of the lower mold 11, whereby the intermediate product 7 is stably formed and held by way of preserving the state of aerial absorption until the product is transferred to the lower mold 21 of the finishing device 20.

The turntable 37 is intermittently rotated. While the turntable 7 is intermittently rotated, the laminates 3 are consecutively fed onto the lower molds 11 of the preliminary molding device 10 via the same operating sequence as was done for the preceding embodiments, thus implementing the initial curving process.

When an intermediate product 7 molded via the initial curving process arrives at the position of the shifting unit 34 after the turntable 37 making a substantially full turn, the intermediate product 7 on the lower mold 11 of the preliminary molding device 10 is shifted onto the adjacent lower mold 21 of the finishing device 20 via operation of the shifting unit 34. When the lower mold 21 arrives at the position right below the upper mold 22 of the finishing device 20, the upper mold 22 descends to execute the second curving process between the lower mold 21 and the upper mold 22 by way of effecting 50~60 kg of load against the intermediate product 7. Accordingly, a polarizing lens 1 being the final product is properly molded, which is provided with a non-spherical 8R×5R curved surface 2 in which curve along the direction X of the polarizing axis is sharper than curve along the direction Y orthogonal to the polarizing axis. Absorptive force is activated inside of the concavity of the surface 21A of the lower mold 21 while the secondary curving process goes on, and yet, the state of aerial absorption is held on until the final product is recovered so that the form of the product can be stabilized.

While the turntable 37 is intermittently rotated, in the same operating sequence as was performed for the preceding embodiments, intermediate products 7 are consecutively transferred from the lower molds 11 of the preliminary molding device 10 to the adjacent lower molds 21 of the finishing device 20 so that the secondary curving process can properly be executed.

When a final product molded via the secondary process arrives at the position of the shifting unit 34 after a substantially full turn of turntable 37, the final product held on the lower mold 21 of the finishing device 20 is drawn out via operation of the shifting unit 34 and then moved onto the conveyor 45. Transfer of an intermediate product 7 from a lower mold 11 of the preliminary molding device 10 to the adjacent lower mold 21 of the finishing device 20 may be executed simultaneous with the transfer of the final product from the lower mold 21 to the conveyor 45, and yet, transfer of the intermediate product 7 and that of the final product may also be executed in sequence.

What is claimed is:

1. A polarizing lens for sunglasses comprising a curved laminate which has a polarizing thin layer and supporting layers made from polycarbonate-resin being laminated on both surfaces of the thin layer; and said laminate being formed as a oblong in which polarizing axis is corresponded to the cross direction thereof, and comprising a non-spherical curved surface whose curve along the direction of polarizing axis is sharper than curve along the direction orthogonal to said polarizing axis.

2. A method of producing a polarizing lens for sunglasses comprising the steps of:

curving a laminate to mold a intermediate product having a curved surface, said laminate has a polarizing thin layer and supporting layers made from polycarbonate-resin being laminated on both surfaces of the thin layer and being formed as a oblong in which polarizing axis is corresponded to the cross direction thereof;

curving said intermediate product to mold a final product which has a curved surface having different curvature from that of the intermediate product, said curved surface of the final product being formed non-spherical so that curve along the direction of polarizing axis is sharper than curve along the direction orthogonal to said polarizing axis.

3. The method of producing a polarizing lens set forth in claim 2, wherein said intermediate product is so formed as to have a spherical curved surface whose curve along the direction of polarizing axis is gentler than that of said final product and curve along the direction orthogonal to said polarizing axis is sharper than that of said final product.

4. An apparatus for producing polarizing lenses for sunglasses comprising;

a preheating unit for preheating laminates, each of the laminates having a polarizing thin layer and supporting layers made from polycarbonate-resin being laminated on both surfaces of the thin layer, and being formed as a oblong in which polarizing axis is corresponded to the cross direction thereof; and a molding unit comprising a preliminary molding device for curving the laminates preheated by said preheating unit to mold intermediate products, a finishing device for curving said intermediate products to mold final products, and a shifting unit for shifting said intermediate products from said preliminary molding device to said finishing device, said intermediate product is so formed as to have a spherical curved surface whose curve along the direction of polarizing axis is gentler than that of said final product and curve along the direction orthogonal to said polarizing axis is sharper than that of said final product, and said final product is so formed as to have a non-spherical curved surface whose curve along the direction of polarizing axis is sharper than curve along the direction orthogonal to said polarizing axis.

\* \* \* \* \*